United States Patent
Azimi et al.

(10) Patent No.: US 6,390,689 B1
(45) Date of Patent: May 21, 2002

(54) IN-LINE OPTOELECTRONIC DEVICE PACKAGING

(75) Inventors: Masud Azimi, Nashua, NH (US); Parviz Tayebati, Boston; Daryoosh Vakhshoori, Cambridge, both of MA (US)

(73) Assignee: CoreTek, Inc., Wilmington, MA (US)

( * ) Notice: Subject to any disclaimer, the term of this patent is extended or adjusted under 35 U.S.C. 154(b) by 0 days.

(21) Appl. No.: 09/425,253

(22) Filed: Oct. 22, 1999

Related U.S. Application Data

(60) Provisional application No. 60/105,171, filed on Oct. 22, 1998.

(51) Int. Cl.[7] .................................................. G02B 6/36
(52) U.S. Cl. .............................. 385/88; 385/73; 385/75
(58) Field of Search ................................ 385/88–94, 73, 385/75

(56) References Cited

U.S. PATENT DOCUMENTS 5,625,733 A    4/1997  Frigo et al. .................... 385/88
5,857,048 A    1/1999  Feuer et al. .................... 385/88

*Primary Examiner*—Rodney Bovernick
*Assistant Examiner*—Juliana K. Kang
(74) *Attorney, Agent, or Firm*—Pandiscio & Pandiscio

(57) ABSTRACT

A fiber connector that facilitates alignment of and electrical communication with electrooptical devices on an optical fiber or interposed between optical fibers. An embodiment of in-line optoelectronic device packaging constructed according to principles of the invention includes a ferrule configured to receive an optical fiber with an optoelectronic device mounted on one end of the ferrule, for alignment with the fiber. Electrically-conductive deposits along the side of the ferrule supply electrical energy to or conduct electrical signals from the optoelectronic device. The optoelectronic device-carrying ferrule is inserted in a ceramic sleeve. Another ferrule, maintaining another optical fiber, also is inserted in the ceramic sleeve. Another embodiment constructed according to principles of the invention includes a second optoelectronic device mounted on the second ferrule. The electrically-conductive deposits permit ready serial deployment of optoelectronic devices, such as a variable attenuator or VCSEL laser emitter, between the optical fibers maintained by the ferrules in the sleeve.

5 Claims, 3 Drawing Sheets

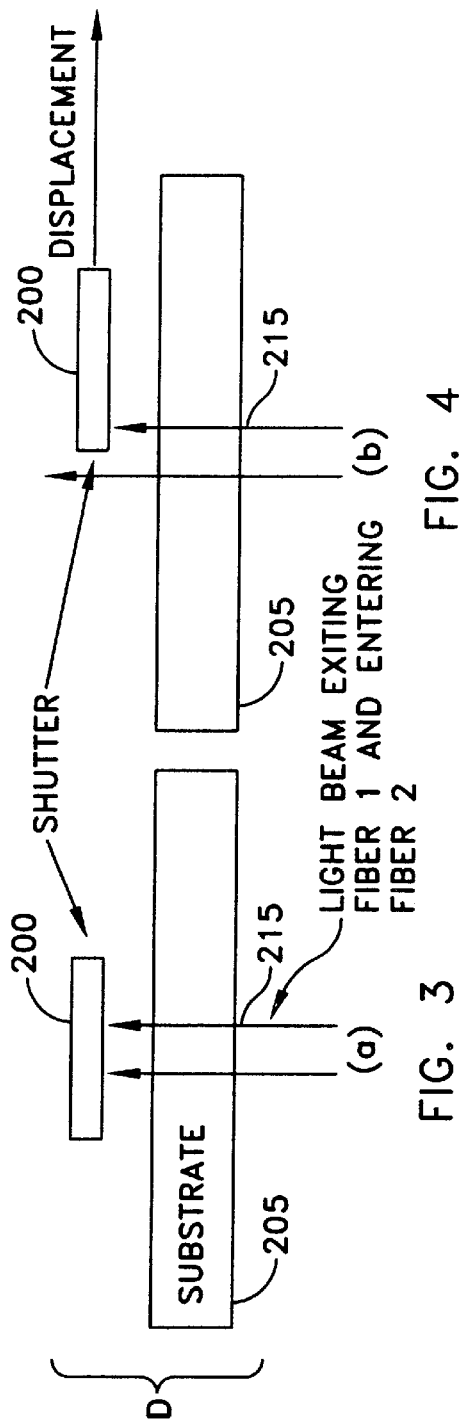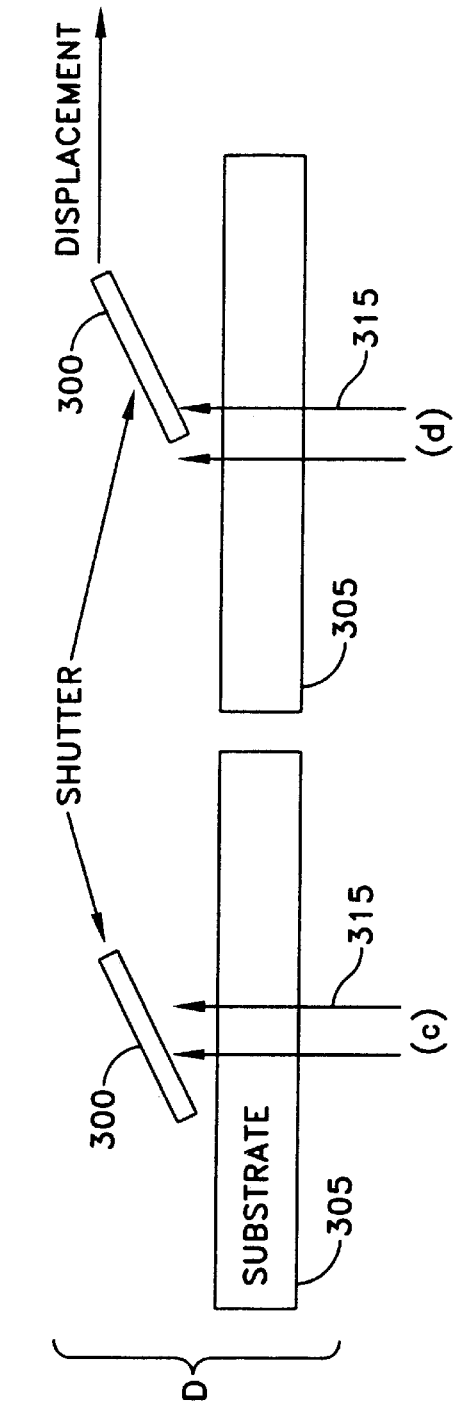

IN-LINE OPTOELECTRONIC DEVICE PACKAGING

REFERENCE TO EARLIER PATENT APPLICATION

This Application claims the benefit of U.S. Provisional Application No. 60/105,171, filed Oct. 22, 1998, by M. Azimi et al., entitled Novel Packaging Technology For In-line Optoelectronic Devices, which application is hereby incorporated herein by reference.

FIELD OF THE INVENTION

The invention relates to optoelectronic device-optical fiber installation and alignment.

BACKGROUND OF THE INVENTION

Fiber optics is a branch of physics based on the transmission of light through transparent fibers. Individual or bundled optical fibers can carry light for hundreds of miles. An optical fiber has a highly transparent core, typically constructed from glass or plastic and encased in a cladding. Light from a laser, incandescent light bulb or other source enters one end of the optical fiber. Light traveling through the core is contained by the cladding because the inside surface of the cladding bends or reflects light inwardly. At the other end of the fiber, a detector, such as a photosensitive device or the human eye, receives the light.

Commercially available high-tolerance fiber ferrules closely received in corresponding sleeves, commonly referred to as fiber connectors, often are used to couple serial individual fibers. These ferrules, normally made of Zirconia, Alumina or metals, each are made with a through-hole for receiving a fiber. The ferrules are precisely manufactured to provide less than 1 micron center-to-center tolerance between serially-aligned ferrules. When retained in a sleeve, the ferrules maintain the cores of the fibers with high-precision alignment, which results in less than 0.5 dB coupling loss.

Many optical applications rely on interposing optoelectronic devices between aligned fibers. These optoelectronic devices often require electrical energy in order to operate. Where the fibers are coupled with fiber connectors, placement of the optoelectronic device for optimal transmission therethrough is problematic. Delivering electrical energy to or monitoring electrical signals from the optoelectronic device also is difficult.

What is needed is a fiber connector that facilitates alignment of and electrical communication with optoelectronic devices on or between optical fibers.

SUMMARY OF THE INVENTION

The invention provides for alignment of and electrical communication with optoelectronic devices on or between optical fibers. In addition to inter-fiber submicron alignment accuracy, the invention provides low-cost packaging and electrical connectivity for optoelectronic devices and detectors.

Packaging in-line devices, such as CoreTek's tunable filter and variable optical attenuator, is disclosed. The packaging takes advantage of commercially available high tolerance fiber ferrules and corresponding sleeves normally used for fiber connectors. These ferrules, normally made of Zirconia, Alumina or metals, each are made with a through-hole for receiving a fiber. The ferrules are precisely manufactured to within less than 1 micron center-to-center tolerance between ferrules. When placed inside a sleeve, the ferrules maintain the cores of the fibers with high-precision alignment, which results in less than 0.5 dB coupling loss.

An embodiment constructed according to principles of the invention includes a ferrule configured to receive an optical fiber. An optoelectronic device is mounted on one end of the ferrule, for alignment with the fiber. Electrically-conductive deposits along the side of the ferrule supply electrical energy to or conduct electrical signals from the optoelectronic device. The optoelectronic device-carrying ferrule is inserted in a ceramic sleeve. Another ferrule, maintaining another optical fiber, also is inserted in the ceramic sleeve. The two ferrules are aligned in the sleeve and capable of transmitting light with minimal coupling loss.

Another embodiment constructed according to principles of the invention includes a second optoelectronic device mounted on the second ferrule. Electrically-conductive deposits on the second ferrule provide for electrical communication with and permit ready interposition of optoelectronic devices, such as a variable attenuator or VCSEL laser emitter, between the optical fibers maintained by the ferrules in the sleeve.

These and other features of the invention will be appreciated more readily in view of the drawings and detailed description below.

BRIEF DESCRIPTION OF THE DRAWINGS

The invention is described in detail below with reference to the following figures, throughout which similar reference characters denote corresponding features consistently, wherein:

FIGS. 3 and 4 are schematic representations of an embodiment of an attenuating optical modulator, articulated to and from a displaced position, respectively, constructed according to principles of the invention;

FIGS. 5 and 6 are schematic representations of another embodiment of an attenuating optical modulator, articulated to and from a displaced position, respectively, constructed according to principles of the invention;

DETAILED DESCRIPTION OF THE INVENTION

The invention is a fiber connector that facilitates alignment of and electrical communication with electrooptical devices on an optical fiber or interposed between optical fibers.

Figure 1:
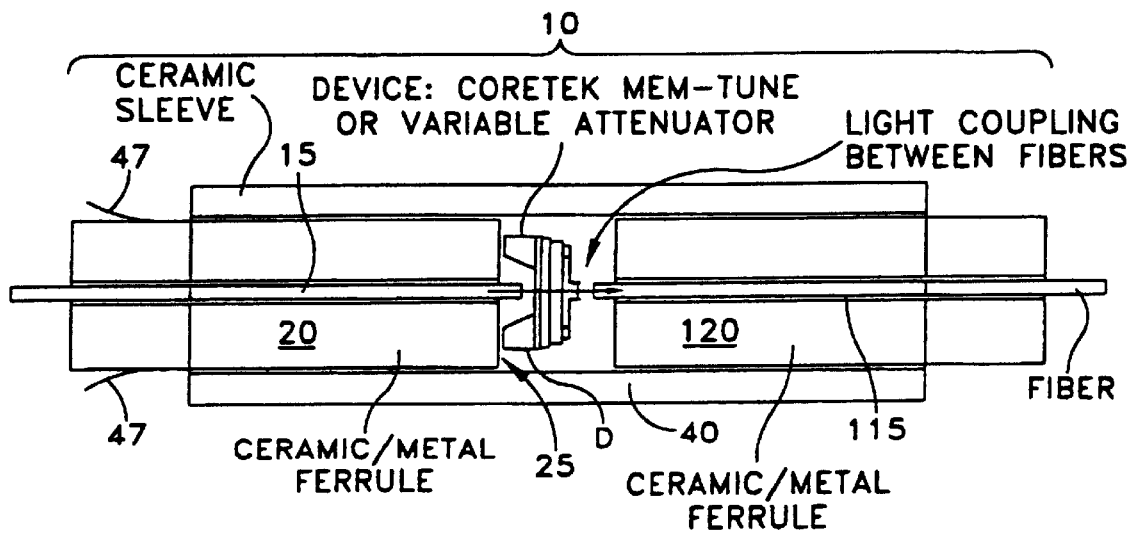
FIG. 1 is an axial cross-sectional detail view of an embodiment of in-line optoelectronic device packaging constructed according to principles of the invention.

Referring to FIG. 1, an embodiment of the present packaging 10 is shown incorporating a device D, such as a CoreTek tunable filter. The filter requires axial, inter-fiber positional accuracy within 0.5 micron.

The packaging 10 is constructed as follows: First, a fiber 15 is positioned inside a ferrule 20. The ferrule 20 is constructed and machined in a manner well known in the art, thus is not described here.

An optoelectronic device D, such as the filter, is positioned on a first end 25 of the ferrule 20 and aligned to optimize throughput or other optical performance criteria. Once the device D and fiber 15 are aligned, the device D is fixed to the ferrule 20 with an adhesive or thin film solder (not shown) pre-deposited on the joining surfaces.

Figure 2:
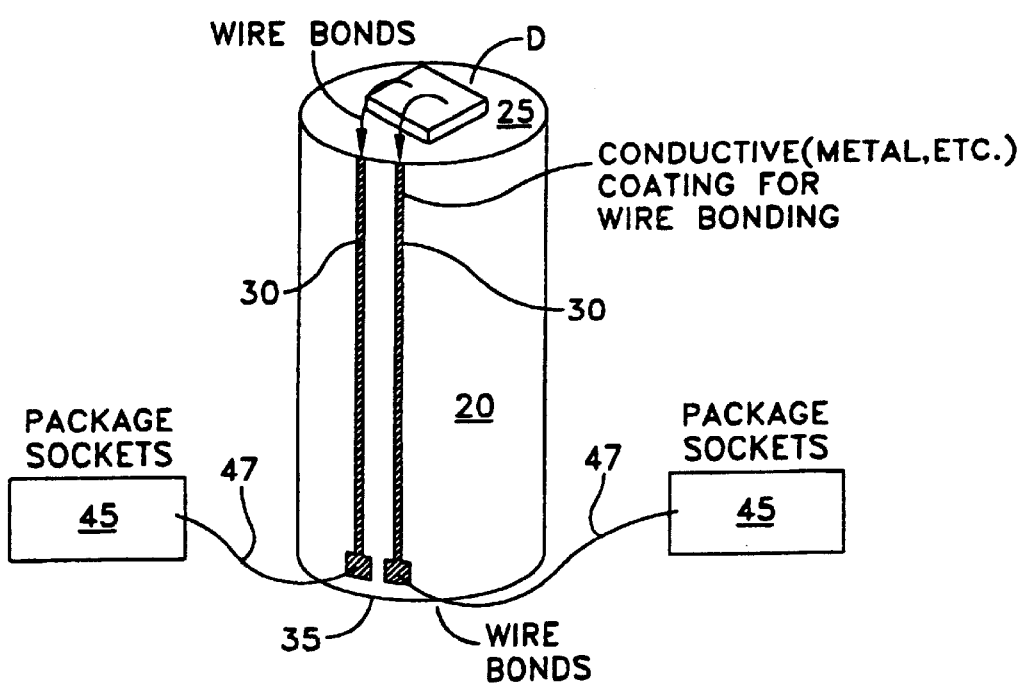
FIG. 2 is a top side elevational view of an embodiment of an optoelectronic device mounted on a ferrule constructed according to principles of the invention.

Referring also to FIG. 2, once the device D is bonded to the ferrule 20, the device D is electrically connected to electrical conductors, shown as metal pads 30, deposited on the ferrule 20. The use of deposited electrically conductive films as electrical connections are advantageous to the invention. The metal pads (strips) 30 run from the first end 25 of the ferrule 20, along the side of the ferrule 20, to a second end 35 of the ferrule 20. Although two metal pads 30 are shown, any number of metal pads 30 may be deposited on the ferrule 20 as needed.

Once the device D is connected to the electrical conductors 30, the ferrule 20 is inserted into a metal or ceramic sleeve 40. The ferrule 20 and sleeve 40 are configured and toleranced to provide optimal coaxial alignment among the fiber 15, ferrule 20 and sleeve 40.

Once inserted in the ceramic sleeve 40, at the second end 35 of the ferrule 20, the metal strips 30 are electrically connected to feed-throughs or sockets 45 by means of wire leads 47. This may be achieved with wire bonding or any suitable connection convention.

Having assembled the first ferrule 20 with the sleeve 40, a second ferrule 120, carrying a second fiber 115, is inserted into the sleeve 40. As mentioned above, the first ferrule 20 and second ferrule 120 are precisely manufactured so that, when inserted into the sleeve 40, the first fiber 15 and second fiber 115 are in good alignment and occasion minimal light transmission loss.

In one embodiment, the device D is a micromachined tunable Fabry-Perot filter, such as a CoreTek MEM-TUNE filter.

Referring to FIGS. 3 and 4, in another embodiment, the device D is a micromachined microelectromechanical (MEM) optical modulator which may function as a variable attenuator. This embodiment of a MEM device includes a movable reflective or absorptive "shutter" 200. The shutter 200 translates relative to a light-passing substrate 205 normal to the direction 215 of the optical beam.

Referring to FIGS. 5 and 6, in a further embodiment, the device D also is a micromachined MEM optical modulator variable attenuator. This embodiment, however, includes a tiltable "shutter" 300 which rotates angularly with respect to the direction 315 of the optical beam.

Figure 7:
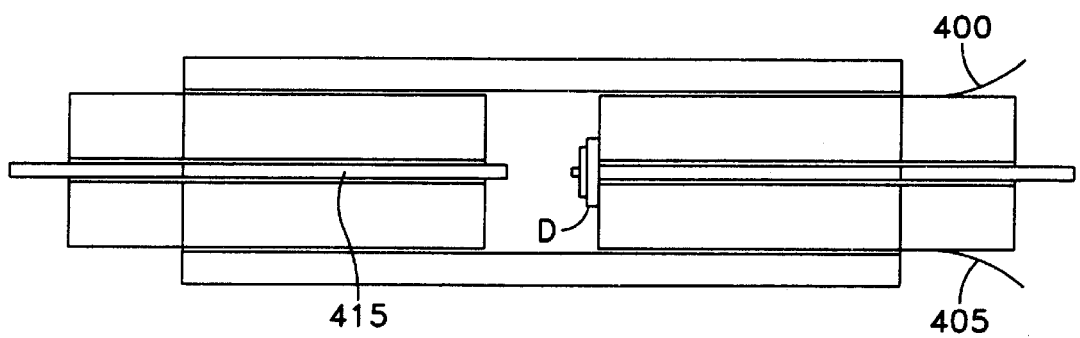
FIG. 7 is an axial cross-sectional detail view of another embodiment of in-line optoelectronic device packaging constructed according to principles of the invention.

Referring to FIG. 7, an additional embodiment of the ferrule-mounted device D is a detector. The detector, responsive to light transmitted from the first fiber 415 therethrough, generates a corresponding electrical signal that may be perceived by a sensor (not shown) via electrical leads 400 and 405 that are connected to ferrule-supported conductor (not shown) like the conductors 30 shown in FIG. 2.

Figure 8:
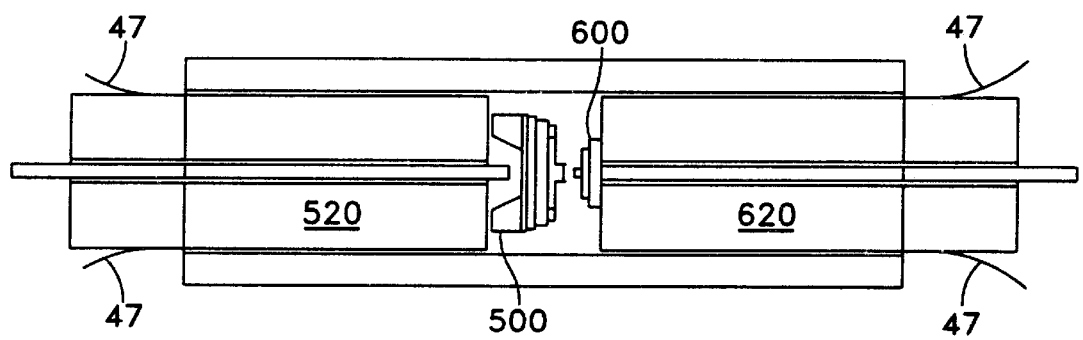
FIG. 8 is an axial cross-sectional detail view of a further embodiment of in-line optoelectronic device packaging constructed according to principles of the invention.

Referring to FIG. 8, yet another embodiment of an optoelectronic device constructed according to principles of the invention includes mounting an optical device on the first ferrule 520 as well as mounting an optical device on the second ferrule 620. As with the first embodiment, a tunable filter 500 is mounted on the first ferrule 520. Additionally, as with the foregoing embodiment, a detector 600 is mounted on the second ferrule 620. Ferrules 520 and 620 are like the ferrule shown in FIG. 2. This combination forms a spectrometer.

The invention is not limited to the foregoing, but encompasses all improvements and substitutions consistent with the principles of the invention.

What is claimed is:

1. An optoelectronic assembly comprising:

first and second ferrules each having an axial bore and first and second opposite ends having first and second flat end surfaces respectively that extend transversely of said bores;

first and second optical fibers disposed in said axial bores of said first and second ferrules respectively, said optical fibers being aligned with one another;

an optoelectronic device mounted on said first end surface of said first ferrule in alignment with said first optical fibers;

at least two conductors mounted on the outside of said first ferrule, said conductors each having first and second opposite ends, said first end of said conductors on said first ferrule end being connected to said optoelectronic device, and said second ends of said conductors being located adjacent said second end surface of said first ferrule;

a sleeve surrounding and connecting said first and second ferrules, said sleeves serving to hold said ferrules so that said first and second optical fibers are axially aligned with each other, said ferrules being spaced from one another within said sleeve with said optoelectronic device disposed between them, and said ferrules protruding from the opposite ends of said sleeve; and electrically conductive connecting means connected to said second ends of said conductors on said first ferrule for connecting said optoelectronic device to a source of electrical energy or for conducting electrical signals from said optoelectronic device.

2. An optoelectronic assembly according to claim 1 wherein said electrically conductive connecting means comprise wire leads that extend out from the adjacent end of said sleeve.

3. An optoelectronic assembly according to claim 1 further including a second optoelectronic device mounted on said first end surface of said second ferrule in confronting relation with said first-mentioned optoelectronic device.

4. An optoelectronic assembly according to claim 3 further including at least two additional conductors mounted on the outside of said second ferrule, each of said additional conductors having a first end connected to said second optoelectronic device and a second end located adjacent said second end surface of said second ferrule; and electrically conductive connecting means connected to said second ends of said additional conductors for enabling electrical communication with said second optoelectronic device.

5. An optoelectronic assembly comprising:

first and second ferrules each a longitudinally-extending bore and first and second opposite ends having first and second end surfaces respectively;

an optoelectronic device mounted on said first end surface of said first ferrule;

at least two conductors mounted on the outside of said first ferrule, said conductors each having first and second opposite ends, said first end of said conductors on said first ferrule end being connected to said optoelectronic device, and said second ends of said conductors being located adjacent said second end surface of said first ferrule;

a sleeve surrounding and connecting said first and second ferrules so that their said longitudinally-extending bores are in axial alignment with each other, said ferrules being spaced from one another with said optoelectronic device disposed between them;

electrically conductive connecting means connected to said second ends of said conductors on said first ferrule for connecting said optoelectronic device to a source of electrical energy or for conducting electrical signals from said optoelectronic device;

an optical fiber disposed in said longitudinally-extending bore of said first ferrule; and a second optical fiber disposed in said longitudinally-extending bore of said second ferrule.

* * * * *